F. J. WOLFF.
VALVE.
APPLICATION FILED NOV. 30, 1914.

1,318,521.

Patented Oct. 14, 1919.

Witnesses:

Inventor:
Franklyn J. Wolff
By Munday, Evarts, Adcock & Clarke Attys.

UNITED STATES PATENT OFFICE.

FRANKLYN J. WOLFF, OF CHICAGO, ILLINOIS, ASSIGNOR TO L. WOLFF MANUFACTURING COMPANY, OF CHICAGO, ILLINOIS, A CORPORATION OF ILLINOIS.

VALVE.

1,318,521.　　Specification of Letters Patent.　　Patented Oct. 14, 1919.

Application filed November 30, 1914.　Serial No. 874,631.

*To all whom it may concern:*

Be it known that I, FRANKLYN J. WOLFF, a citizen of the United States, residing in Chicago, in the county of Cook and State of Illinois, have invented a new and useful Improvement in Valves, of which the following is a specification.

My invention relates in general to valves and more particularly to the type of valves known commercially as "check valves."

Check valves are provided ordinarily to prevent water or other liquid of different pressures and from different sources to be conveyed to a single outlet without danger of the liquid under greater pressure preventing the liquid under the lesser pressure reaching said outlet, and without danger of the liquid under greater pressure forcing back the liquid under lesser pressure. These devices are frequently used in connection with shower baths where extremely annoying results are experienced by reason of slight variation in pressure between the hot and cold water supplies. If the hot water pressure is greater than the cold water pressure it often happens that this excess of pressure causes the delivery of only hot water at the faucet, or if the excess is not sufficient for this it prevents the ready regulation of the bath to desired temperature.

It is a principal object of this invention to provide check valves for this and other systems of extreme sensitiveness, so arranged that the controlling taps from the hot and cold supplies may be accurately and readily adjusted to equalize the pressure for a given temperature.

A further object of the invention is the provision of such a device wherein the parts will be so constructed and arranged that the check valve will operate with equal efficiency when installed properly in either horizontal or vertical positions and which will operate with considerable efficiency when they are improperly installed in any position, one of the objects being to provide a valve of the character described which will operate in inverted position. This is of material importance because of the fact that such valves are at times installed by relatively unskilled mechanics.

A further object of the invention is to provide a valve possessing these and other virtues consisting of few and cheaply provided parts which may be readily assembled and which may be removed from the casing for repair or re-adjustment, both of the parts and of the casing, without disconnecting the casing from the system of which it forms a part.

Other objects and advantages of the invention will be apparent as it is better understood from the following description when considered in connection with the accompanying drawing illustrating a preferred embodiment thereof.

Referring to the drawings.

Figure 1:
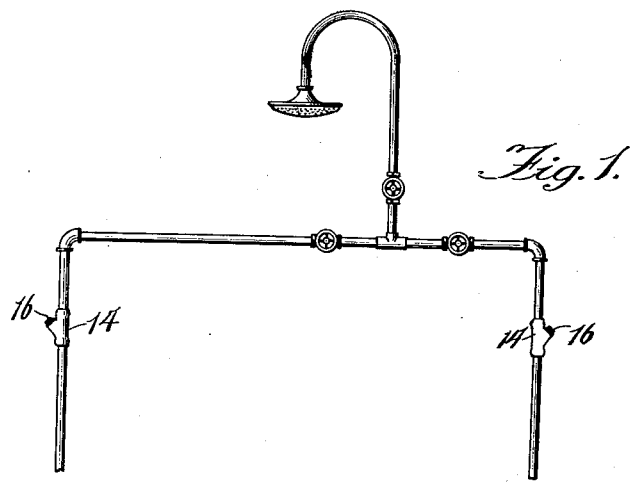
Figure 1 is a partial view of a shower bath system provided with check valves embodying my invention and showing said check valves arranged in vertical position.
Figure 2:
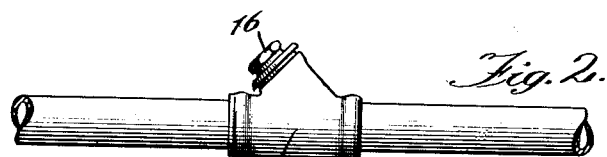
Fig. 2 is a partial view of a second system showing a check valve arranged in horizontal position.

The check valve embodying my invention and shown on the drawing consists primarily, in the present instance, of a valve casing designated generally at 5 and having a valve seat 6, a ball valve 7 adapted to engage the seat 6 and a valve guide 8 for guiding said ball valve in its movement.

The casing 5 consists of an elongated hollow member threaded at its ends at 9 for engagement with sections of the supply pipe between and to which it is intended that the check valve be connected. The seat 6 consists of a web 10 disposed across the opening and through the casing 5 at substantially 45 degrees and having a valve opening 11 extending therethrough. Extending outwardly from the side of the casing, and preferably formed integral therewtih, is an elbow 12, the central axis of which is disposed at right angles to the seat 6 and said axis passing through the geometrical center of said seat. The elbow 12 is opened at its outer end and this opening is threaded at 13 for engagement of the valve guide, as will be later described.

The valve guide 8, in the present instance, consists of a hollow sleeve or stem 14 adapted to extend from the opening in the elbow 12 to just above the valve seat. This sleeve has threads 15 adapted to engage the threads 13 in the opening in the elbow to hold the sleeve in predetermined relation with respect to the valve seat. The outer end of the sleeve is closed and formed into a nut 16 adapted to be turned down against the end of the elbow, suitable packing 17 being provided to prevent leakage about the sleeve. A shoulder is formed within the guide to limit the inward movement of the ball valve 7 and prevent it from passing the aperture in the guide, as will be later described. A plurality of openings 18 are provided through the sleeve, which openings communicate with the interior of the casing and with the interior of the elbow about the sleeve. The lower end 19 of the sleeve is formed to receive the ball valve 7 when this ball valve is in open or inoperative position. The diameter of the ball valve 7 is sufficiently large to prevent the valve sticking in the seat, but is preferably not sufficiently large to permit the center of gravity of the ball valve to fall above or without the seat when the valve is in closed position. The extremity of the end 19 of the guide is removed from the seat a sufficient distance to permit the center of gravity to be disposed outwardly of or in alinement with the seat when the valve is in open position. This disposes the valve in substantially unstable equilibrium so that upon the slightest back pressure exerted in the direction of the arrow in Fig. 3, being felt on the edge of the valve through the openings 18 it will be moved over into closed position. Should the device be installed in inverted position so that the ball must be lifted into engagement with the seat, appreciable back pressure will accomplish this by reason of the fact that the entire rear half of the ball, that is, the half within the guide, feels this pressure per unit of area while the other side does not feel the pressure being subjected to the lesser pressure of the inflowing water from its source.

Figure 3:
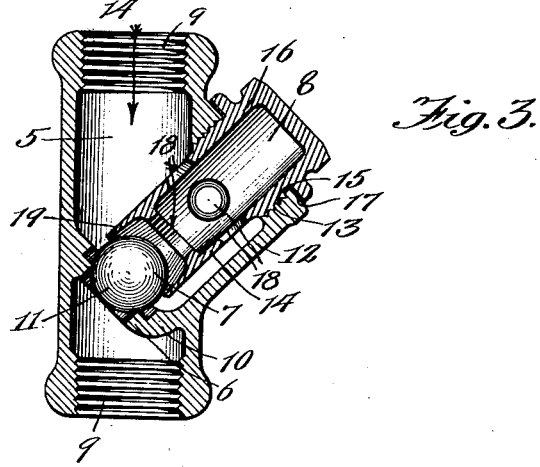
Fig. 3 is a vertical section taken longitudinally of one of these check valves.
Figure 4:
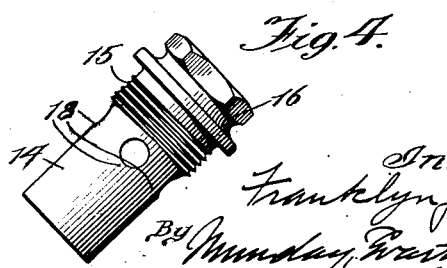
Fig. 4 is a side elevation of the valve guide forming a part of the check valve.

The parts are few and readily assembled and the sleeve and ball may be removed for replacement or repair by turning the nut 16 and lifting out these parts. If desired the valve seat may be cut away as shown in Fig. 3 to provide a rest for the ball valve when in open position. This defines and renders more accurate the position of the ball valve when in unstable equilibrium. If desired the seat may be smoothed and re-adjusted through the opening thus provided. This valve cannot be positioned, when properly constructed, so that it will not be operative.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. A check valve comprising a valve casing, an angularly disposed seat in said casing, a ball valve for closing against the seat, a support coöperating with the seat for sustaining the ball in open position by two engagements at its bottom and separated about the surface of the ball when the latter is in open position by a relatively small arc, whereby to maintain said ball in normal position in unstable equilibrium and adapted to tilt over onto the seat at a relatively slight back pressure.

2. A check valve comprising a casing, an angularly disposed seat thereacross, a ball valve for engaging said seat and an annular continuous support for said ball arranged in a plane parallel to the plane of said seat and closely adjacent thereto, to coöperate with the seat in holding the ball in unstable equilibrium and in position to tilt over onto the seat under slight back pressure.

3. A check valve comprising a casing, an angularly disposed seat thereacross, a ball valve for engaging said seat and an annular continuous support for said ball arranged in a plane parallel to the plane of said seat and closely adjacent thereto, to coöperate with the seat in holding the ball in unstable equilibrium and in position to tilt over onto the seat under slight back pressure, said support and seat engaging the edge of the ball in such unstable equilibrium when the valve is in horizontal and in vertical positions.

Signed in the presence of two witnesses.

FRANKLYN J. WOLFF.

Witnesses:
 A. S. SAUNDERS, Jr.,
 ROBERT LITTLE.